United States Patent [19]

Siemon

[11] Patent Number: 4,732,401
[45] Date of Patent: Mar. 22, 1988

[54] JOG CART TRAINING ATTACHMENT

[76] Inventor: Drew A. Siemon, 120 Old Mill Rd., Springfield, Ohio 45506

[21] Appl. No.: 855,229

[22] Filed: Apr. 23, 1986

[51] Int. Cl.⁴ .............................................. B60R 3/00
[52] U.S. Cl. ..................................... 280/163; 182/91; 182/127; 280/63
[58] Field of Search ....................... 280/63, 163; 54/2; 272/70.3, 70.4; 128/1 R, 376, 377; 182/91, 127, 90, 92

[56] References Cited

U.S. PATENT DOCUMENTS

| | | | |
|---|---|---|---|
| 885,586 | 4/1908 | Carroll | 280/63 |
| 3,165,314 | 1/1965 | Clearman et al. | 272/70.3 |
| 3,912,292 | 10/1975 | Lichfield | 280/63 |
| 4,093,306 | 6/1978 | Zitone | 280/63 |
| 4,415,061 | 11/1983 | Meyer | 182/92 |
| 4,505,490 | 3/1985 | Plugge | 280/63 |
| 4,610,454 | 9/1986 | Gill | 280/163 |

Primary Examiner—John J. Love
Assistant Examiner—Eric Culbreth
Attorney, Agent, or Firm—Biebel, French & Nauman

[57] ABSTRACT

An attachment for a jog cart that permits a trainer to stand at the rear of the cart close to the jog cart seat while a horse is being broken or trained for cart use, so that the trainer can readily step off the attachment should the horse exhibit unruly behavior which would otherwise expose the trainer to injury. Additionally, the attachment is useful in instructing beginning drivers.

9 Claims, 5 Drawing Figures

JOG CART TRAINING ATTACHMENT

BACKGROUND OF THE INVENTION

A typical two-wheeled jog cart will conventionally include a main frame of inverted U-shape, with the wheels journaled at the lower ends of the legs of the U-shaped frame and a seat attached to the bight portion of the frame. A pair of thills extend forwardly from the main frame along opposite sides of the flanks of the horse to which the cart is attached, and a cross bar extending between the thills just to the rear of the horse carries a pair of downwardly depending loops into which a rider seated on the cart will place his feet with his legs raised to a substantially horizontal position.

In breaking a horse to a jog cart, the horse, even though broken to a saddle, may buck, kick or otherwise exhibit unruly behavior when an attempt is made to train the horse to pull a jog cart.

Obviously the occupant of the cart, seated with his or her legs extended before them, is in a vulnerable position, and as a result can be subjected to serious injury.

Additionally, the rider cannot easily and safely leave the cart should the horse exhibit such dangerous behavior, all of which renders training a horse to a jog cart a hazardous experience.

SUMMARY OF THE INVENTION

In accordance with the present invention an attachment is provided which can be detachably mounted to the main frame of a jog cart, and which permits a trainer to stand at the rear of the cart so that he or she can simply step off should the horse being trained react dangerously to the training exercise. Additionally, it will be apparent that the present invention is useful in teaching beginning drivers.

The attachment includes a footrest, preferably provided with a non-slip type surface which is mounted at the rear and partially beneath the seat of a jog cart and with its surface inclined slightly forwardly and downwardly, so that the trainer has a natural tendency to lean forward.

To support the trainer in this position, a stabilizing assembly is provided which includes a pair of spaced parallel uprights received at their lower ends in sockets mounted on the footrest and having first portions extending substantially vertically upwardly, medial portions inclined forwardly and upwardly and interconnected by a cross brace, and upper portions which also extend substantially vertically upwardly.

The upper portion carries a padded support member having outwardly projecting wings, so that as the trainer leans forwardly with his or her chest against the central portion of the support member the wings of the support member can be gripped between the upper arms and torso of the trainer, leaving the trainer's hands free to handle the reins. To accommodate trainers of different heights, the support member is vertically adjustable along the uprights.

The attachment is mounted on the jog cart by means of a main support bar to which the footrest is preferably pivotally attached, and a series of struts which extend between the main support bar and the footrest to the main frame of the jog cart.

The struts are preferably adjustable in length to accommodate various styles and sizes of jog carts, and the pivotal mounting of the footrest on the main support bar permits the footrest to be pivoted up beneath the seat when not in use after the uprights have been removed from their sockets on the footrest.

Thus, it will be seen that with the present invention a trainer may comfortably stand on a footrest with his or her center of gravity approximately in the position that it would be if he or she were seated on the jog cart, and with their body urged forwardly against the padded support member of the stabilizing assembly and the wing portions of the support member gripped between the upper arms and torso of the trainer, leaving the hands of the trainer free to hold the reins, but positioning the trainer nonetheless such that he or she may simply step off the cart should the horse begin exhibiting potentially dangerous behavior.

DESCRIPTION OF THE PREFERRED EMBODIMENT

Figure 3:
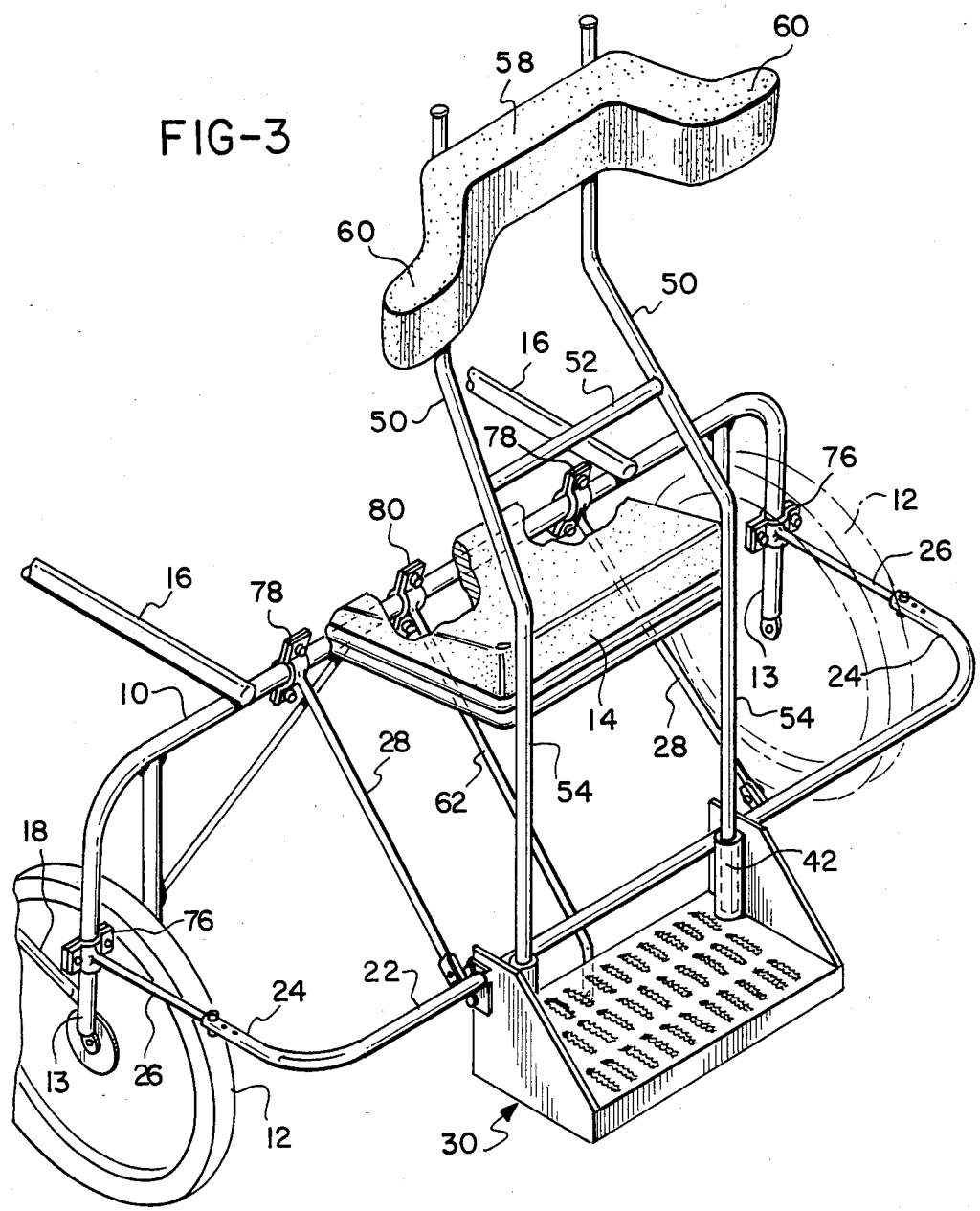
FIG. 3 is a perspective view of the attachment and a portion of a jog cart to which it is attached.
Figure 4:
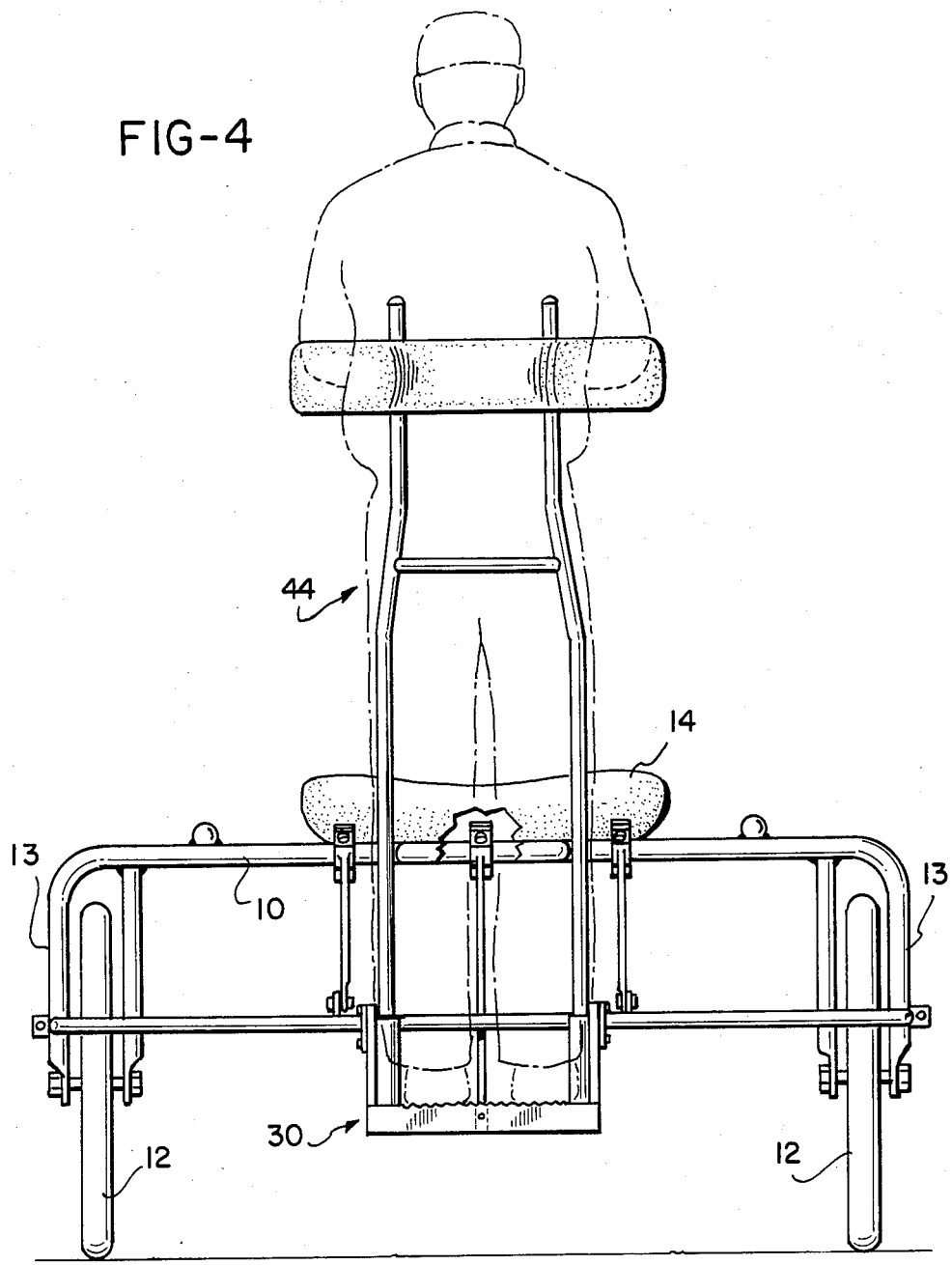
FIG. 4 is a rear elevational view of the attachment and a portion of a jog cart.

As best seen in FIGS. 3 and 4 of the drawings, a conventional jog cart will typically include a substantially U-shaped frame 10 having wheels 12 journaled at the lower ends of the legs 13 of the frame and a seat 14 mounted on the bight portion of the frame. Additionally, a pair of thills 16 extend, as seen in FIG. 3, forwardly where they will be positioned on opposite sides of the flanks of a horse to which the cart is to be attached, and braces 18, as also shown in phantom lines in FIG. 1, may extend upwardly and forwardly from the legs of the frame to the thills.

Figure 2:
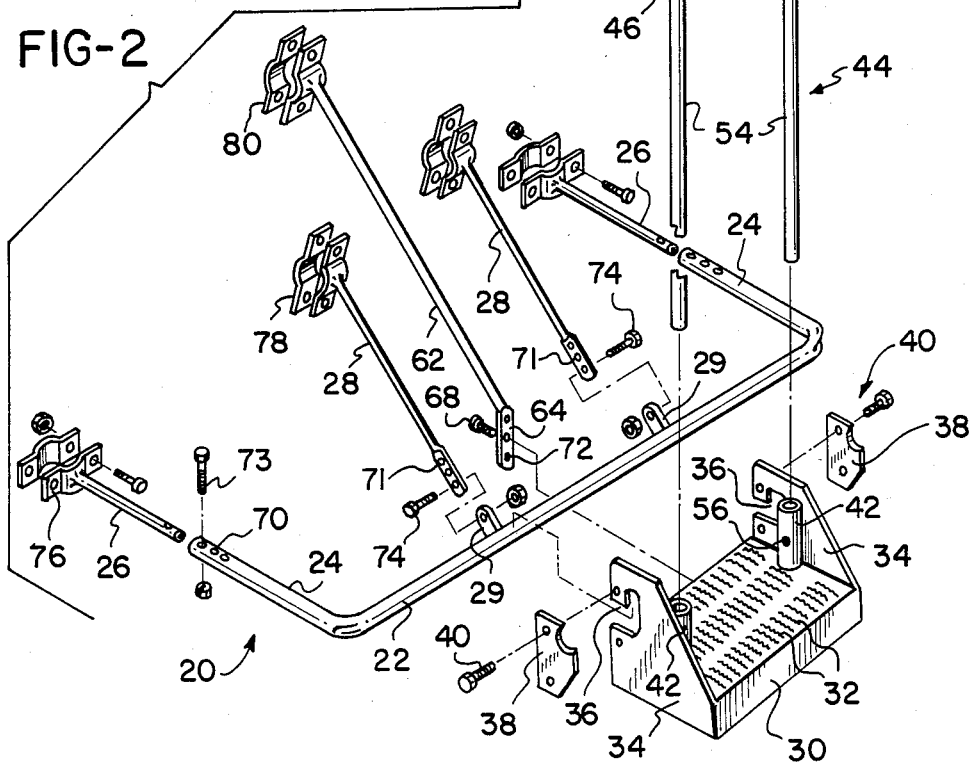
FIG. 2 is an exploded perspective view of the attachement.

With reference particularly to FIGS. 2 and 3 of the drawings, the training attachment 20 includes a main support bar 22 having forwardly curved ends 24 telescopically receiving outer struts 26. Inwardly of the outer ends of the main support bar 22 intermediate struts 28 project upwardly and forwardly from the main support bar and are attached thereto by means of ears 29.

A footrest 30 is provided with a non-slip supporting surface 32, which is inclined slightly downwardly and forwardly, and a pair of side plates 34, each provided with a notched portion 36. The notched portions 36 are adapted to receive the main support bar 22, and closure plates 38 are attached by means of bolts or the like 40 to enclose the main support bar and provide a pivotal mounting of the footrest 30 on the main support bar. Attached to the footrest inwardly of the side plates 34 by welding or the like are upwardly opening tubular sockets 42.

A stabilizing assembly 44 comprises a pair of spaced parallel uprights 46, each including an upper, substantially vertically extending portion 48, a medial, forwardly and upwardly angled portion 50, a interconnecting cross piece 52 and lower, substantially vertically extending portions 54 having their lower ends received in the sockets 42 and secured therein by set screws or the like 56. At its upper end the stabilizing assembly is provided with an upper support member 58 having outwardly projecting wings 60.

A median strut 62 has a flattened, substantially vertically extending attaching portion 64 at its lower end, which is attached to a substantially vertically extending surface 66 (see FIG. 5) of the footrest 30 by means of bolts or the like 68.

It will be noted that each of the struts 26, 28 and 62 are adjustable by virtue of the multiple bolt openings 70, 71 and 72, and bolts 73, 74 and 68 respectively, and the outer ends of each of the struts are provided with clamps 76, 78 and 80 for attachment to the U-shaped frame 10 of a jog cart, as best shown in FIG. 3 of the drawings.

Figure 1:
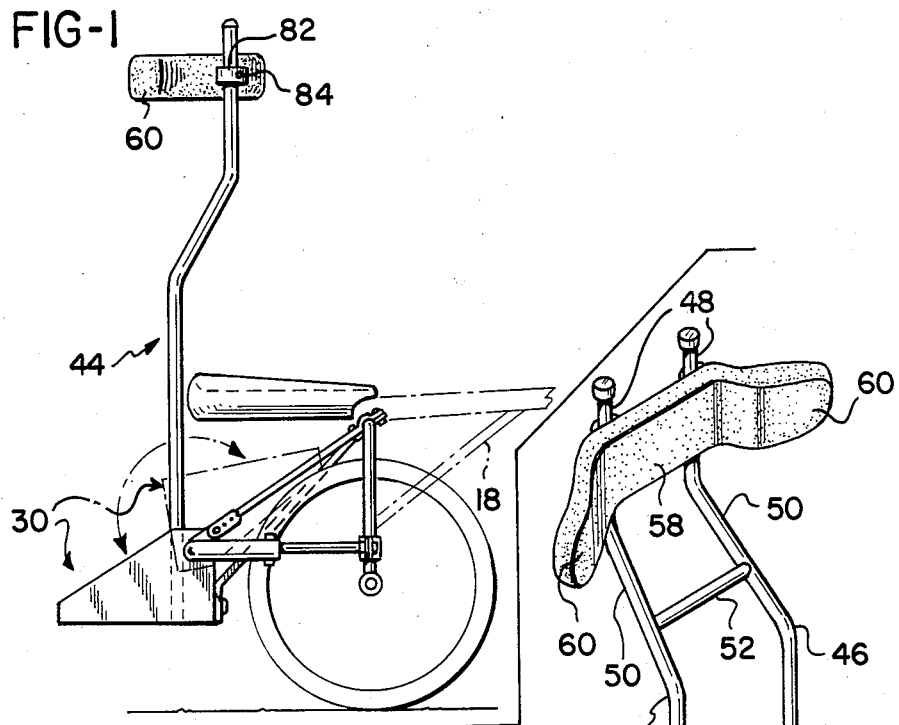
FIG. 1 is a side view of the training attachment of the present invention and a portion of the jog cart to which it is attached.

As seen in FIG. 1 of the drawings, the upper support member 58 has attached thereto in any convenient fashion collars 82 which slidably receive upper portions 48 of the uprights and can be secured along the portions 48 by means of set screws or the like 84.

Figure 5:
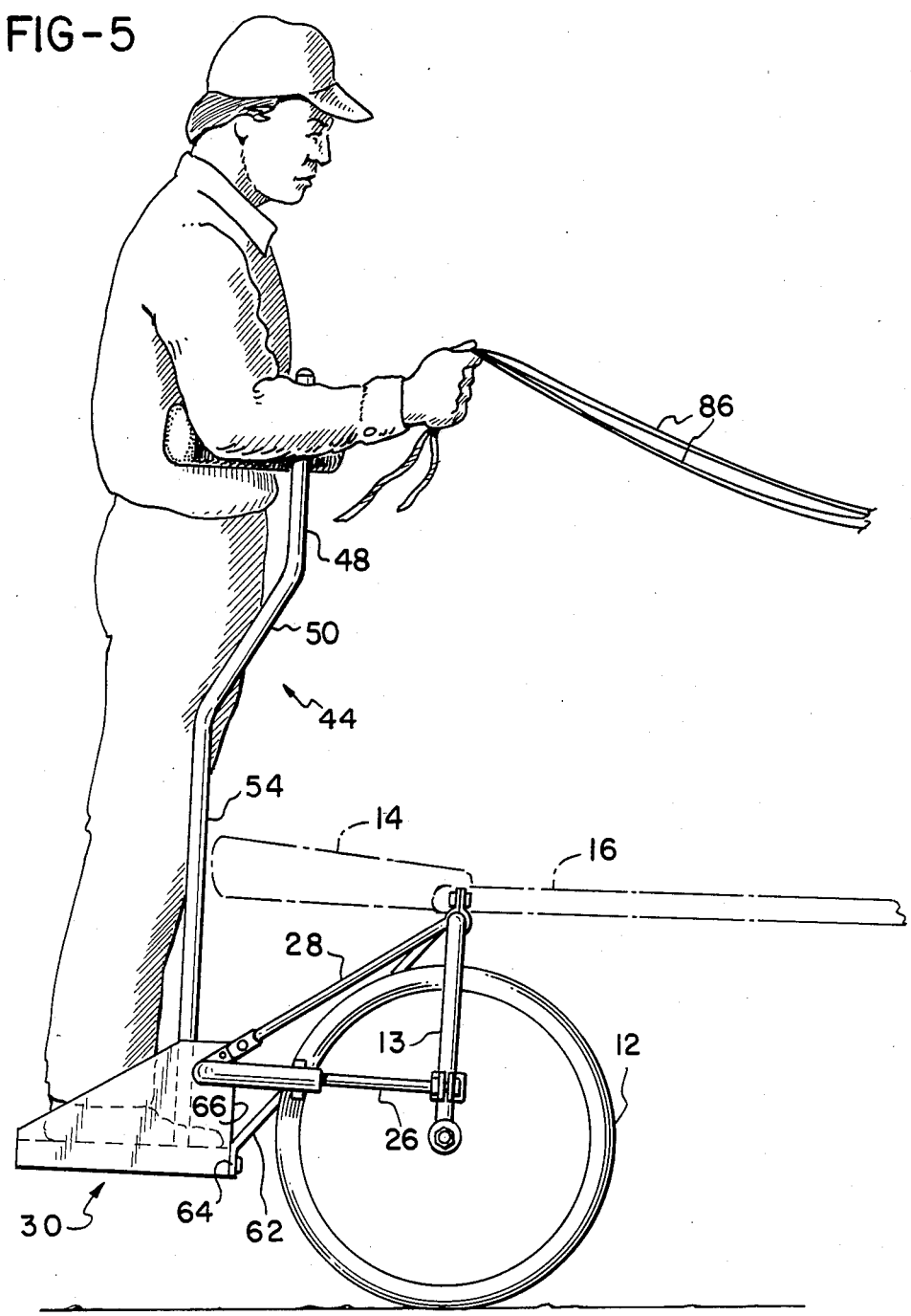
FIG. 5 is a side elevational view of the attachment and a portion of a jog cart showing a trainer in position on the attachment.

With the above construction it will be seen that a trainer, as shown in FIGS. 4 and 5 of the drawing, may stand upon the slightly forwardly and downwardly inclined non-slip surface of the footrest with his or her weight shifted slightly forwardly and against the upper support member 50, with the wings 60 of the support member received between the elbows or upper arms and upper torso of a trainer, with the trainer's hands free to hold the reins 86. The support member is, of course, adjusted vertically as indicated above to position it correctly for the height of a trainer standing on the footrest 30.

Thus, the trainer is positioned sufficiently to the rear of a horse attached to the jog cart that he or she is not in danger of being kicked by a horse pulling the cart, but yet because of the positioning of a footrest partially beneath the seat 14 of a cart the center of gravity of a trainer is very closely positioned to where it would be if the trainer were seated on the cart. However, while a trainer positioned on the seat 14 would be in a hazardous position from which he or she could not readily exit the cart if a horse began exhibiting unruly behavior, in the standing position shown in FIGS. 4 and 5 of the drawing, a trainer may simply step off the footrest whenever a dangerous situation develops.

If it is desired to utilize the jog cart for other than training purposes, the set screws 56 in the sockets 42 can be loosened and the entire stabilizing assembly 44 removed, after which the bolt 68 is removed and the entire footrest pivoted upwardly about the main support bar 22 to an inverted position beneath the seat 14 as shown in phantom lines in FIG. 1 of the drawings. Thus, even though the training attachment is readily attached and detached in its entirety to or from a jog cart, if desired the attachment may be simply stowed to an inoperative position as described above without completely removing the attachment from the jog cart.

While the form of apparatus herein described constitutes a preferred embodiment of this invention, it is to be uderstood that the invention is not limited to this precise form of apparatus, and that changes may be made therein without departing from the scope of the invention which is defined in the appended claims.

What is claimed is:

1. A training attachment for a jog cart comprising:
   a footrest having a non-slip surface extending downwardly and forwardly and adapted to support a trainer in a standing position thereon,
   a pair of sockets projecting upwardly from said footrest on opposite sides thereof,
   a stabilizing assembly including:
      a pair of spaced parallel uprights each having a lower, substantially vertically extending portion received in said sockets, a medial, forwardly and upwardly angled portion, and an upper,
      substantially vertically extending portion, a cross piece interconnecting said medial portions of said uprights, and
      an upper support member extending between and vertically adjustable along said upper portions of said uprights,
      said support member being padded and having outwardly projecting wings adapted to be engaged between the upper arms and torso of a trainer supported on said footrest,
   a main support bar,
   means mounting said footrest on said main support bar for pivotal movement with respect thereto,
   an outer strut, adjustable in length and secured to each end of said main support bar and projecting forwardly therefrom,
   an intermediate strut, adjustable in length and secured to said main support bar adjacent said footrest and projecting forwardly and upwardly therefrom,
   a median strut adjustable in length and secured to said footrest adjacent the center thereof and projecting forwardly and upwardly therefrom, and
   means for attaching outer ends of said struts to structural portions of a jog cart.

2. In combination with a jog cart which includes a frame, a single pair of wheels journalled in said frame, a single driver's seat mounted on said frame between said wheels, and means attached to said frame and extending forwardly away from said seat for attaching said jog cart to a draft animal, a jog cart training attachment comprising:
   a jog cart training attachment frame,
   attaching means for readily attaching and detaching said jog cart attachment frame to and from said jog cart,
   said attaching means securing said jog cart training attachment frame to said jog cart,
   a footrest adapted to support a trainer thereon in a non-seated position, and
   means mounting said footrest on said jog cart attachment frame rearwardly of said seat at an elevation beneath said seat and intermediate said wheels;
   said mounting means positioning said footrest partially beneath said seat of said jog cart,
   whereby a single trainer during training of a draft animal to said jog cart may stand on said footrest in a position to set off it if desired.

3. In combination with a jog cart which includes a frame, a single pair of wheels journalled in said frame, a single driver's seat mounted on said frame between said wheels, and means attached to said frame and extending forwardly away from said seat for attaching said jog cart to a draft animal, a jog cart training attachment comprising:
   a jog cart training attachment frame,
   attaching means for readily attaching and detaching said jog cart attachment frame to and from said jog cart, said attaching means securing said jog cart training attachment frame to said jog cart, a footrest adapted to support a trainer thereon in a non-seated position, means mounting said footrest on said jog cart attachment frame rearwardly of said seat at an elevation beneath said seat and intermediate said wheels; and stabilizing means comprising uprights projecting upwardly from said footrest rearwardly of said seat to assist in stabilizing a trainer supported on said footrest;

whereby a single trainer during training of a draft animal to said jog cart may stand on said footrest in a position to step off it if desired.

4. The attachment of claim 3 further comprising:
a support member interconnecting said uprights.

5. The attachment of claim 4 wherein:
said support member is vertically adjustable along said uprights.

6. The attachment of claim 4 wherein:
said support member is provided with outwardly projecting wing portions adapted to be engaged between the upper arms and torso of a trainer supported on said footrest.

7. The attachment of claim 6 wherein:
said support member is padded and has a central portion adapted to engage the upper front torso of a trainer supported by said footrest.

8. The attachment of claim 6 wherein:
said footrest is provided with a foot supporting surface that is angled downwardly and forwardly.

9. The attachment of claim 8 wherein:
said foot supporting surface is provided with an anti-slip surface.

* * * * *